(12) United States Patent
Xie et al.

(10) Patent No.: US 11,911,979 B2
(45) Date of Patent: Feb. 27, 2024

(54) METHOD FOR MANUFACTURING A STRIKING PLATE OF A GOLF CLUB HEAD

(71) Applicant: ADVANCED INTERNATIONAL MULTITECH CO., LTD., Kaohsiung (TW)

(72) Inventors: Yen-Zhou Xie, Kaohsiung (TW); Yuan-Jen Hou, Kaohsiung (TW)

(73) Assignee: ADVANCED INTERNATIONAL MULTITECH CO., LTD., Kaohsiung (TW)

( * ) Notice: Subject to any disclaimer, the term of this patent is extended or adjusted under 35 U.S.C. 154(b) by 0 days.

(21) Appl. No.: 17/873,595

(22) Filed: Jul. 26, 2022

(65) Prior Publication Data
US 2023/0182413 A1 Jun. 15, 2023

(30) Foreign Application Priority Data
Dec. 15, 2021 (TW) ................. 110146953

(51) Int. Cl.
| | | |
|---|---|---|
| *B29C 70/42* | (2006.01) | |
| *B29C 70/44* | (2006.01) | |
| *B29C 51/00* | (2006.01) | |
| *B29C 51/10* | (2006.01) | |
| *B29C 65/62* | (2006.01) | |
| *B29K 309/08* | (2006.01) | |
| *B29L 31/52* | (2006.01) | |
| *B29K 23/00* | (2006.01) | |

(52) U.S. Cl.
CPC .......... *B29C 70/443* (2013.01); *B29C 51/004* (2013.01); *B29C 51/10* (2013.01); *B29C 65/62* (2013.01); *B29K 2023/06* (2013.01); *B29K 2023/12* (2013.01); *B29K 2309/08* (2013.01); *B29L 2031/5227* (2013.01)

(58) Field of Classification Search
CPC ...... B29C 70/382; B29C 70/443; B29C 70/48
See application file for complete search history.

(56) References Cited

U.S. PATENT DOCUMENTS

| | | | | |
|---|---|---|---|---|
| 6,010,411 A | * | 1/2000 | Reyes ................. | B29C 70/865 473/347 |
| 10,357,901 B2 | * | 7/2019 | Deshmukh ......... | A63B 53/0466 |
| 11,253,755 B2 | * | 2/2022 | Hsiao ................. | A63B 53/0466 |
| 2010/0126652 A1 | * | 5/2010 | Joern ................... | B29C 70/382 156/93 |
| 2010/0282404 A1 | * | 11/2010 | Ellis ..................... | B32B 7/12 156/289 |
| 2012/0318182 A1 | * | 12/2012 | Wockatz .............. | D04H 3/002 112/440 |
| 2020/0139651 A1 | * | 5/2020 | Guha .................... | D03D 11/00 |

* cited by examiner

*Primary Examiner* — Matthew J Daniels
(74) *Attorney, Agent, or Firm* — MUNCY, GEISSLER, OLDS & LOWE, PC

(57) ABSTRACT

A method for manufacturing a striking plate of a golf club head includes the steps of: a sewing step, in which at least one roving material is sewn onto a base material so as to form a laminate blank with an uneven thickness in a normal direction of the base material; and a forming step, in which the laminate blank is placed in a mold cavity of a mold and is formed into the striking plate with an uneven thickness.

11 Claims, 5 Drawing Sheets

METHOD FOR MANUFACTURING A STRIKING PLATE OF A GOLF CLUB HEAD

CROSS-REFERENCE TO RELATED APPLICATION

This application claims priority from Taiwanese Patent Application No. 110146953, filed on Dec. 15, 2021.

FIELD

The disclosure relates to a method for manufacturing a striking plate of a golf club head.

BACKGROUND

A conventional golf club head is made of metal to ensure it has the strength to withstand impact for a long time. However, the metal golf club head is not only expensive, but also is heavy. With the development carbon fiber composite materials, which are lightweight and high strength, they are often made into components for replacing the metal structure of the golf club head, such as the striking plate, in order to maintain sufficient structural strength while reducing the weight thereof.

In a conventional method for manufacturing a carbon fiber composite striking plate, a plurality of prepreg layers are stacked on one another, followed by a cropping treatment. Then, a plurality of reinforcing members are disposed on the resultant prepreg layered structure in different directions to enhance the strength thereof. After cutting excessive parts of the reinforcing members, the obtained structure subjected to a thermoforming process, and the resultant blank is then processed by a machinery, such as a computer numerically controlled (CNC) machine, so as to obtain the striking plate having a predetermined shape.

However, the above conventional method is not only complicated, but also because the prepreg layers are stacked in a layer-by-layer manner, there is fiber strength only in the horizontal direction. This leads to weak mechanical properties of the resultant blank in the thickness direction and the multi-axis direction, and at the same time, it is also difficult to present a complex three-dimensional appearance with an uneven thickness. It can be seen that the striking plate made by the conventional method still has room for improvement in strength and appearance complexity.

SUMMARY

Therefore, an object of the present disclosure is to provide a method for manufacturing a striking plate of a golf club head that can alleviate at least one of the drawbacks of the prior art.

According to this disclosure, a method for manufacturing a striking plate of a golf club head comprises the steps of: a sewing step, in which at least one roving material is sewn onto a base material so as to form a laminate blank with an uneven thickness in a normal direction of the base material; and a forming step, in which the laminate blank is placed in a mold cavity of a mold and is formed into the striking plate with an uneven thickness.

BRIEF DESCRIPTION OF THE DRAWINGS

Other features and advantages of the disclosure will become apparent in the following detailed description of the embodiment with reference to the accompanying drawings, in which.

DETAILED DESCRIPTION

Referring to FIGS. to a method for manufacturing a striking plate of a golf club head according to an embodiment of the present disclosure includes a sewing step and a forming step.

Figure 1:
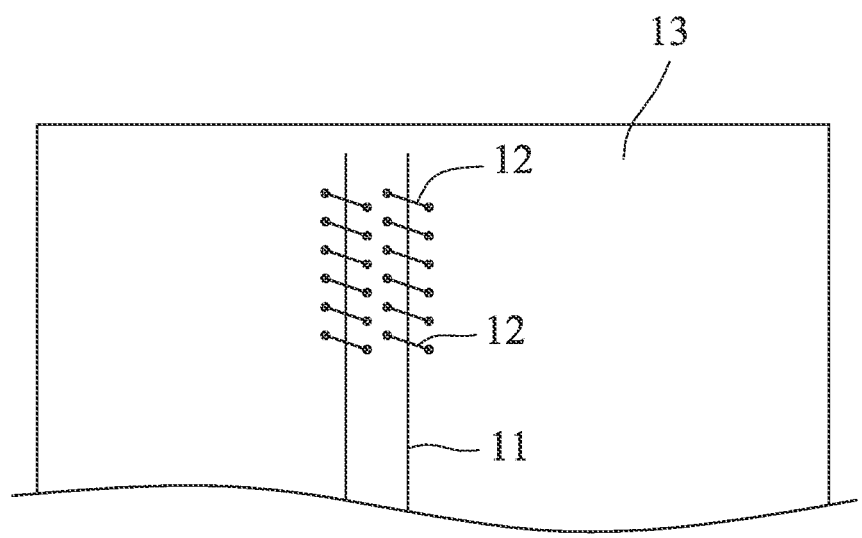
FIG. 1 is a fragmentary schematic view of a sewing step of a method for manufacturing a striking plate of a golf club head according to an embodiment of the present disclosure.
Figure 2:
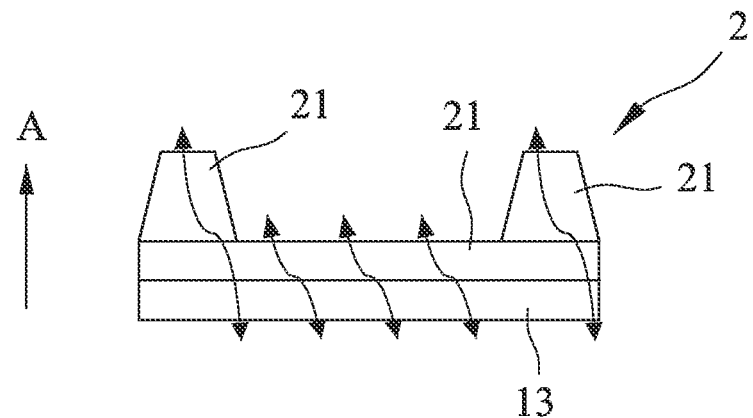
FIG. 2 is a schematic view of a laminate blank formed by the sewing step of the embodiment, but without an embedded member.

With reference to FIGS. 1 and 2, in the sewing step, at least one roving material 11 is sewn onto a base material 13 using, e.g., a tailored fiber placement (TFP) machine, and a plurality of thread materials 12 are further stitched to the base material 13 to fix the roving material 11 on the base material 13. The roving material 11 and the thread materials 12 are selected from the group consisting of inorganic fibers, such as Glass fibers, carbon fibers, Kevlar fibers, ceramic fibers, etc.; thermoplastic fibers, such as polypropylene (PP) fibers, polyester (PET) fibers, nylon fibers, etc.; and metal fibers, such as titanium wire, copper wire, and steel wire. In this embodiment, the roving material 11 and the thread material 12 have different types of fibers. Further, the number of the roving material 11 can also be multiple as required.

The base material is selected from, the group consisting of fiberglass, polyethylene, polypropylene and a thermoplastic film, and has a maximum thickness of 4.5 mm.

The sewing and stitching path of the roving material 11 and the thread materials 12 may be designed in a predetermined pattern so as to obtain a laminate blank with a desired three-dimensional structure. The laminate blank 2 includes a plurality of laminate layers 21 each of which is composed of the roving material 11 and the thread materials 12. The laminate layers 21 are stacked to form the laminate blank 2 with an uneven thickness in a normal direction (10 of the base material 13. In this embodiment, each laminate layer 21 has a fiber angle that can be arbitrarily selected from -180 degrees to 180 degrees, and a fiber path that can be a straight line, a curved line or a polyline according to the requirements, even a spiral design can be adopted, so that the appearance design and the fiber orientation of each laminate layer 21 are not limited to what is disclosed herein.

Figure 3:
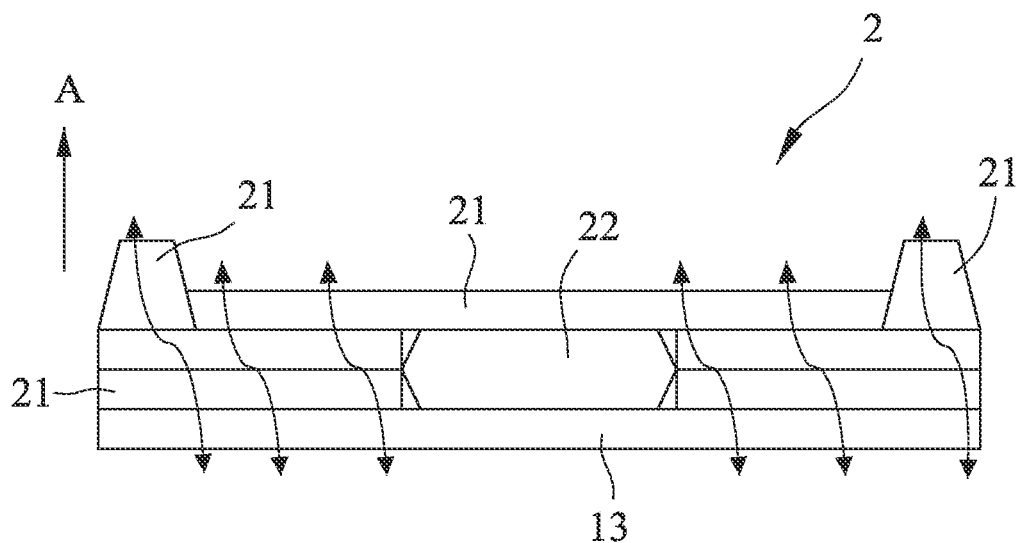
FIG. 3 is a schematic view of a laminate blank formed by the sewing step of the embodiment embedded with an embedded member.

With reference to FIG. 3, an embedded member 22 is placed on the base material 13, and is embedded in and covered by the stacked laminate layers 21 of the laminate blank 2 such that the laminate blank 2 is embedded with the embedded member 22.

Figure 4:
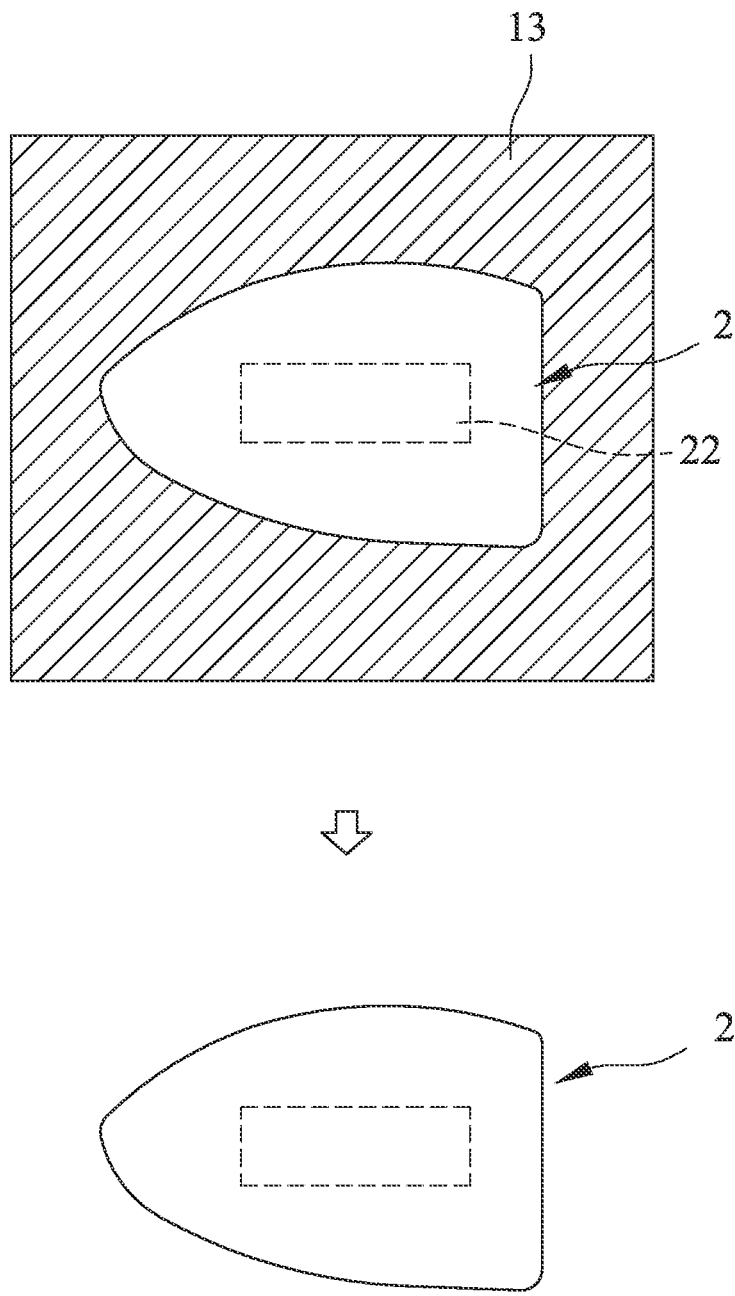
FIG. 4 is a schematic view, illustrating how the laminate blank of FIG. 3 can be obtained.

With reference to FIG. 4, the laminate blank 2 is tailored to have the desired three-dimensional shape by trimming the base material 13. It should be noted that, in addition to trimming the base material 13 as described above, the base material 13 can also be completely removed by melting or tearing. Of course, the base material 13 may be left without being trimmed or removed. The shape of the embedded member 22 can be rib-shaped, sheet-shaped, or any irregular shapes, and the material thereof can be titanium, aluminum, iron, tungsten, copper or other alloys. The number of the embedded member 22 can also be multiple according to the requirements, and can be arranged and distributed according to the needs of reinforcement structure.

As compared to the conventional carbon fiber prepreg composite material, in which the prepreg layers are used and required to be stacked on one another and then subjected to the complicated cropping treatment, the method of this disclosure can simply form the laminate blank 2 with an improved strength by sewing the roving material 11 and the thread materials 12 on the base material 13 using automated machines, and hence labor and time costs can be greatly reduced.

Moreover, with the roving material 11 sewn on the base material 13 along the normal direction (A) thereof, the laminate layers 21 can also generate fiber reinforcement in the thickness direction which is the same as the normal direction (A), and in coordination with the free fiber path design in the horizontal direction, multi-axial fiber reinforcement can be achieved, thereby effectively increasing the overall strength.

Figure 5:
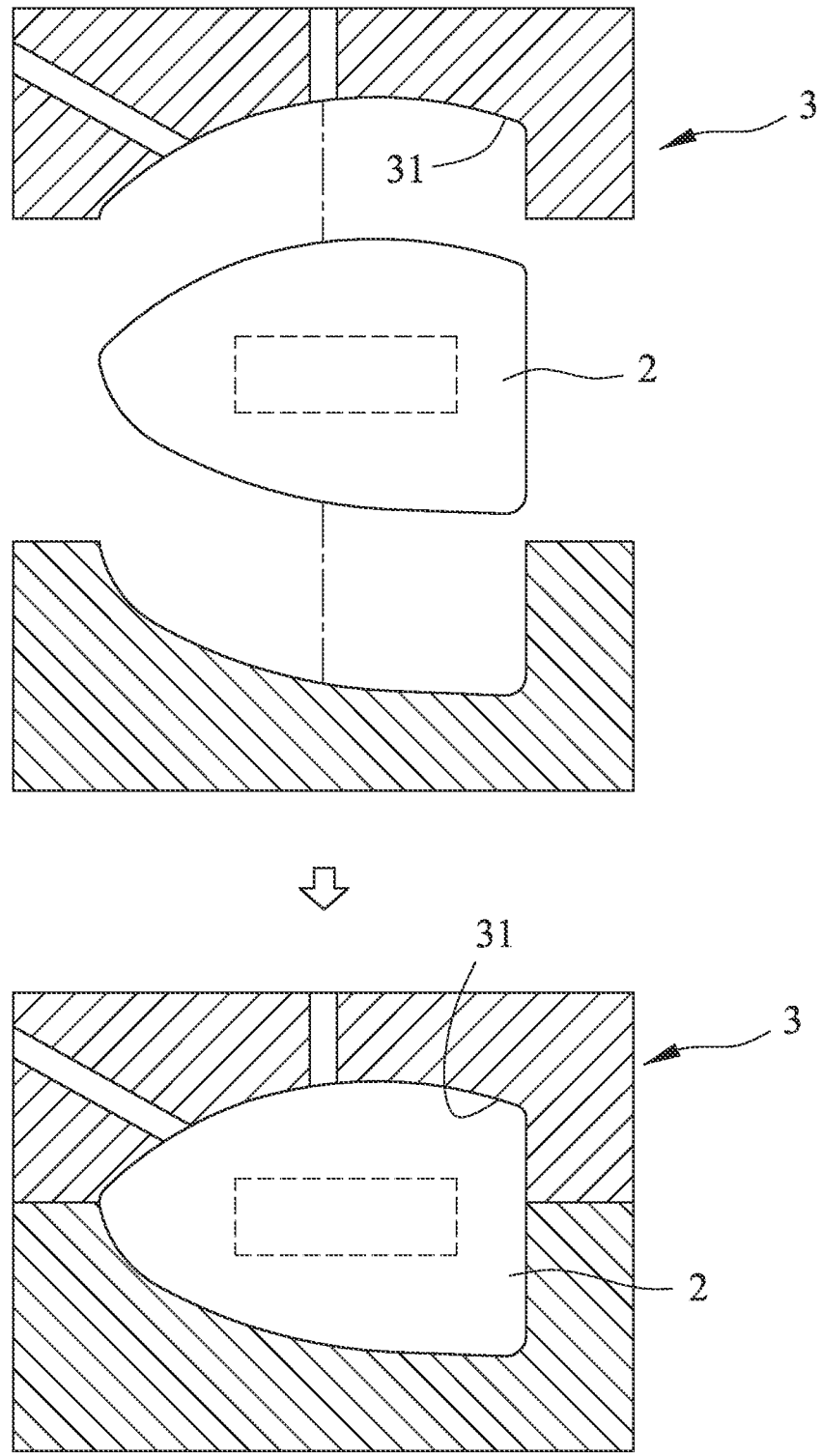
FIG. 5 is a schematic view, illustrating a forming step of the embodiment.
Figure 6:
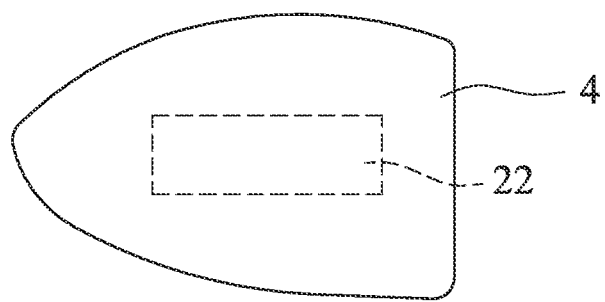
FIG. 6 is a schematic view of the striking plate obtained from the forming step.

With reference to FIGS. 5 and 6, in the forming step, a mold 3 including an upper mold half and a lower mold half is prepared, and the laminate blank 2 is placed in a mold cavity 31 cooperatively defined by the upper mold half and the lower mold half of the mold 3, after which the upper mold half and the lower mold half are mated and pressed together. Next, air in the mold cavity 31 is evacuated to place the mold cavity 31 in a vacuum state, and the resin material is impregnated into the laminate blank 2 by applying high pressure. With such procedure, fluidity of the resin material would not be adversely affected by air and pressure, and thus the resin material is capable of being evenly, distributed throughout the laminate blank 2. Then, under an elevated temperature, the laminate blank 2 and the resin material are thermoformed in the mold cavity 31 into a striking plate 4, as shown in FIG. 6.

By impregnating the resin material into the laminate blank 2 that is placed in the mold cavity 31 under vacuum, the resin fluidity can be improved, so that the obtained striking plate 4 has a low defect rate, thereby enhancing the quality of the striking plate 4 thus manufactured.

Since this disclosure has sufficient fiber strength in the thickness direction for fixing, the striking plate 4 can nave an uneven thickness and a diversified shape, and the embedded member 22 embedded therein can produce supporting and strengthening effects, so that support force and overall structural strength of the striking plate 4 can be increased.

It should be noted that this embodiment may also adopt another forming method, which is mainly to use polypropylene (PP) fibers, polyester (PET) fibers, nylon fibers, or other thermoplastic fibers as the roving material 11 and the thread materials 12 in the sewing step, while in the forming step, after the laminate blank 2 is placed in the mold cavity 31 and the mold 3 is closed, the laminate blank 2 is thermoformed into the striking plate 4.

In summary, the striking plate 4 manufactured by the method of this disclosure has a good structural strength and can present a diversified three-dimensional appearance with uneven thickness, and the embedded member 22 inside the striking plate 4 can further enhance the overall strength thereof.

Furthermore, the manufacturing method of this disclosure does not need multiple stacking of the prepreg layers and complicated cropping treatment, so that manpower and working time can be saved, while the costs thereof can be effectively reduced. In addition, since the striking plate 4 is of a net size, there is no need to use CNC machine for processing, so that the production efficiency thereof is increased. Therefore, the object of this disclosure can indeed be achieved.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for manufacturing a striking plate of a golf club head comprising:
a sewing step, in which at least one roving material is sewn onto a base material so as to form a laminate blank with an uneven thickness in a normal direction of the base material, wherein at least one embedded member is placed on the base material, and is embedded in the at least one roving material when the at least one roving material is sewn onto the base material such that the laminate blank is embedded with the at least one embedded member, the laminate blank comprises a plurality of laminate layers covering the at least one embedded member; and
a forming step, in which the laminate blank is placed in a mold cavity of a mold and is formed into the striking plate with an uneven thickness.

2. The method as claimed in claim 1, wherein, in the forming step, after the laminate blank is placed in the mold cavity, the following steps are performed:
vacuuming the mold cavity;
impregnating a resin material into the laminate blank placed in the mold cavity under vacuum; and
thermoforming the laminate blank and the resin material in the mold cavity into the striking plate.

3. The method as claimed in claim 1, wherein:
in the sewing step, the at least one roving material is thermoplastic fibers; and
in the forming step, after the laminate blank is placed in the mold cavity, the laminate blank is thermoformed into the striking plate.

4. The method as claimed in claim 1, wherein, in the sewing step, the at least one roving material is selected from the group consisting of inorganic fibers, thermoplastic fibers, and metal fibers.

5. The method as claimed in claim 1, wherein, in the sewing step, at least one thread material is further stitched to the base material to fix the at least one roving material on the base material.

6. The method as claimed in claim 5, wherein the at least one roving material and the at least one thread material are selected from the group consisting of inorganic fibers, thermoplastic fibers, and metal fibers, and wherein the at least one roving material and the at least one thread material have different types of fibers.

7. The method as claimed in claim 1, wherein each of the laminate layers has a fiber angle of −180 degrees to 180 degrees.

8. The method as claimed in claim 1, wherein each of the laminate layers has a fiber path that is a curved line or a polyline.

9. The method as claimed in claim 1, wherein, in the sewing step, after the laminate blank is formed, the laminate blank is tailored to have a predetermined shape by trimming the base material.

10. The method as claimed in claim 1, wherein, in the sewing step, after the laminate blank is formed, the base material is removed by melting or tearing.

11. The method as claimed in claim 1, wherein the base material is selected from the group consisting of fiberglass, polyethylene, polypropylene and a thermoplastic film.

* * * * *